Patented July 5, 1949

2,475,506

UNITED STATES PATENT OFFICE 2,475,506

METALLIZABLE BENZIMIDAZOLE AZO DYESTUFFS

Charles E. Lewis, Somerville, N. J., assignor to American Cyanamid Company, New York, N. Y., a corporation of Maine No Drawing. Application September 26, 1945, Serial No. 618,796

6 Claims. (Cl. 260—157)

This invention relates to metallizable azo dyestuffs having lake-forming groups ortho to the azo group derived from 5-hydroxy-benzimidazoles. The products may be represented by the following formula:

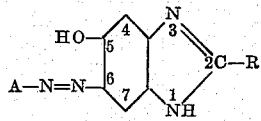

in which R is hydrogen or a radical of the benzene or lower aliphatic series, A is the residue of a diazotized aromatic amine having a lake-forming group in ortho-position to the azo group.

Azo dyes capable of metallization are widely used in dyeing goods, followed or accompanied by metallization treatments such as in the top chrome, bottom chrome and metachrome processes or for the preperation of complexes with salts of metals having an atomic weight from 52-64. Metallizable dyestuffs are extensively used in dying basic nitrogeneous fibers and important properties for such dyeings are high tinctorial power and resistance to fading under ultra violet light.

The dyestuffs of the present invention are of importance in all of these fields of usefulness and most of them are characterized by strong tinctorial power and superior resistance to fading.

Some typical 5-hydroxy-benzimidazoles which are useful in preparing the dyestuffs of the present invention are: 2-methyl-5-hydroxy benzimidazole, 2-ethyl-5-hydroxy benzimidazole, 5-hydroxy benzimidazole, 2-phenyl-5-hydroxy benzimidazole, 2-(4'-sulfophenyl)-5-hydroxy benzimidazole, 2-p-tolyl-5-hydroxy benzimidazole, 2-(4'-aminophenyl) - 5 - hydroxy benzimidazole. These 5-hydroxy benzimidazoles are readily obtained through reduction of a 3-nitro-4-acylamino phenyl ester of an organic carboxylic acid and cyclization according to the procedure described by S. D. Gershon and G. L. Webster (J. American Chemical Society, vol. 63, page 2853, 1941).

The diazo components useful in preparing the products of the present invention are those that contain in the ortho position to the diazo group a lake-forming group which can be converted into a heavy metal complex. The lake-forming are particularly the hydroxyl group and the carboxylic acid group; also the alkoxy and halogen which under specific conditions in the process of metallization may be replaced by the complex-forming hydroxyl. Some typical examples of useful amines for the production of these diazo components are 2-amino-4-nitro phenol, 2-amino-5-nitro phenol, 3-amino-4-hydroxy benzene sulfonic acid, 2-methyl-4-amino-5-hydroxy benzene sulfonic acid, 2-nitro-4-amino-5-hydroxy benzene sulfonic acid, 2-chloro-4-amino-5-hydroxy benzene sulfonic acid, 2-hydroxy-3-amino-5-chloro benzene sulfonic acid, 3-amino-4-hydroxy-5-nitro benzene sulfonic acid, 2-hydroxy-3-amino-5-nitro benzene sulfonic acid, 2-hydroxy-3-amino-5-sulfo-benzoic acid, 2-amino-5-sulfobenzoic acid, anthranilic acid, 1-(4'-sulfophenyl)-3-methyl-4-amino - 5 - pyrazolone, 1 - amino-2-hydroxy naphthalene-4-sulfonic acid, 1-amino-2-hydroxy-6-nitro naphthalene-4-sulfonic acid, 3,3'-dichloro benzidine, ortho-dianisidine and the like.

The diazo components may be also further substituted by azo groups and benzimidazoles may be used also as end components in polyazo dyes.

The invention is further illustrated by the following examples, the parts being parts by weight.

Example 1

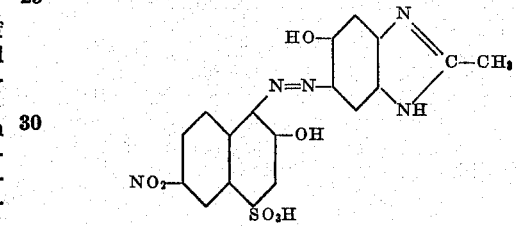

A solution of 2.96 parts of 2-methyl-5-hydroxy benzimidazole in 60 parts of water containing 0.24 part sodium hydroxide is iced internally to 5° C. and 6.8 parts of 1-diazo-2-hydroxy-6-nitro naphthalene-4-sulfonic acid (87% purity) is added. The reaction mixture is stirred until coupling is complete as in indicated by a negative diazo test on spotting against alkaline H-acid solution. The reaction mixture is diulted with 50 parts of water and hydrochloric acid is added until the solution is acidic when spotted on Congo red test paper. The precipitated dyestuff is separated by filtration, and is dried at 55° C.

Example 2

0.05 par of the azo dyestuff obtained from Example 1 are dissolved in 300 parts of water and to the solution are added 5 parts of a 10% solution of Glauber's salt and 4 parts of a 10% solution of ammonium sulfate. 5 parts of a wetted-out wool skein are added to the dye bath and the whole is boiled with agitation for ½ hour, maintaining the volume constant by addition of water. There is then added 1.5 parts of a 10% solution of acetic acid and boiling is continued for an additional ½ hour.

After rinsing and drying, the woolen skein is levelly dyed a deep brown of somewhat bluish shade.

*Example 3*

5 parts of a wetted-out wool skein are dyed according to the procedure described in Example 2 and then 4 parts of a 1% solution of potassium dichromate is added to the dye-bath. After continued boiling for 40 minutes, the wool skein is rinsed and dried. The wool is thus dyed a jet black shade of excellent fastness to light and washing.

In a similar manner, a wool dyeing is aftertreated with copper sulfate solution in the presence of a slight excess of acetic acid, producing an attractive violet shade.

*Example 4*

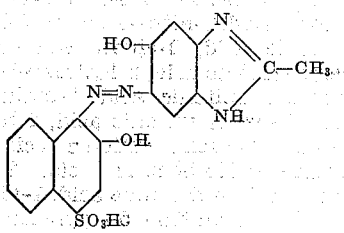

A solution of 2.96 parts of 2-methyl-5-hydroxy benzimidazole in 60 parts of water containing 0.24 part of sodium hydroxide is cooled by addition of ice to 5° C. and 5.4 parts of the diazo compound (92.6% purity) derived from 1-amino-2-hydroxy naphthalene-4-sulfonic acid in the usual manner and 1 part of pyridine are added. The reaction mixture is stirred until coupling is complete as is indicated by a negative diazo test on spotting against H-acid solution and then 25 parts of water are added. The azo dyestuff is precipitated by acidification with hydrochloric acid and is isolated by filtration.

The dyestuff so obtained dyes wool by the procedure described in Example 2 a violet shade.

This dyeing is converted to a gray of bluish cast by the topchrome procedure described in Example 3 and to a violet by aftertreatment with a copper salt by the similar procedure.

*Example 5*

5 parts of 2-amino-4-nitrophenol-6-sulfonic acid (93.7% purity) in 60 parts of water containing 10 parts of hydrochloric acid (17%) are diazotized by the addition of 20 parts of a 7% sodium nitrite solution. The diazo solution so obtained is added to a stirred solution containing 2.96 parts of 2-methyl-5-hydroxy benzimidazole, 5 parts of 20% sodium hydroxide solution and 20 parts of 10% sodium carbonate solution in 100 parts of water. The temperature is maintained at 5° C. during the addition and while stirring to completion of the coupling. The dyestuff is precipitated by acidifying the solution with hydrochloric acid to an acidic test to Congo red paper followed by addition of salt, and is separated by filtration.

This dyestuff produces on wool a yellowish brown according to the dyeing procedure of Example 2.

*Example 6*

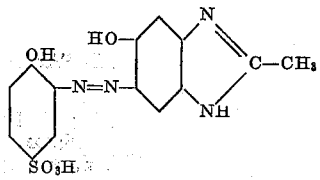

1.89 parts of 2-aminophenol-4-sulfonic acid in 35 parts of water is treated with 1.25 parts of hydrochloric acid (1.19) and is diazotized by the addition of 10 parts of a 7% solution of sodium nitrite. The diazo solution as obtained is added slowly to an agitated solution containing 1.48 parts of 2-methyl-5-hydroxy benzimidazole, 5 parts of 20% sodium hydroxide solution and 20 parts of 10% sodium carbonate solution in 50 parts of water. The reaction mixture is maintained at 5° C. during this addition and until completion of the coupling. After acidification with hydrochloric acid to an acidic test against Congo red test paper, the product is precipitated by addition of salt and is separated by filtration.

The dyestuff so obtained dyes wool according to the procedure described in Example 2 a yellowish brown shade. This is converted by the topchrome procedure of Example 3 to a rich Bordeaux shade.

*Example 7*

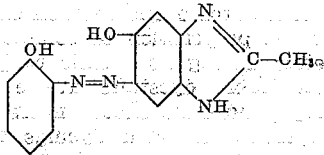

1.83 parts of 2-amino-4-nitrophenol (84% purity) in 20 parts of water are treated with 3.8 parts of hydrochloric acid (17%) and then with 10 parts of a 7% solution of sodium nitrite. The resulting diazo solution is added at a low temperature to an agitated solution containing 1.48 parts of 2-methyl-5-hydroxy benzimidazole, 2.5 parts of a 20% solution of sodium hydroxide and 10 parts of a 10% solution of sodium carbonate in 50 parts of water. When coupling is complete, the dyestuff is separated by filtration.

The dyestuff so obtained dyes wool according to the procedure described in Example 2 a red-brown shade. This is converted by the topchrome procedure to a chocolate brown and by aftertreatment with copper salt to a reddish tan shade.

The term "lake-forming group" is used in the specification and claims in its ordinary meaning in the chemistry of metallizable azo dyes namely, a group which is capable of forming a complex with metals having an atomic weight from 52–64, such groups being normally hydroxyl, alkoxy, chlorine and carboxylic acid groups.

The term "lower alkyl" is used in its ordinary sense as covering alkyl groups having from 1–5 carbon atoms.

I claim:

1. A metallizable azo dyestuff prepared by coupling a diazotized carbocyclic aromatic amine having not more than two nuclei and having a lake-forming group ortho to the diazo group with a compound of the formula

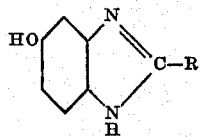

in which R is a member of the group consisting of hydrogen, mononuclear aryl, and lower alkyl.

2. A metallizable dyestuff according to claim 1 in which the substituent on the 2-carbon atom is lower alkyl.

3. A metallizable dyestuff according to claim 1 in which R is methyl.

4. The metallizable azo dyestuff obtained by coupling diazotized 1-amino-6-nitro-2-napthol-4-sulfonic acid with 2-methyl-5-hydroxybenzimidazole.

5. The metallizable azo dyestuff obtained by coupling diazotized 2-amino-4-nitrophenol-6-sulfonic acid with 2-methyl-5-hydroxybenzimidazole.

6. The metallizable azo dyestuff obtained by coupling diazotized 2-amino-4-nitrophenol with 2-methyl-5-hydroxybenzimidazole.

CHARLES E. LEWIS.

REFERENCES CITED

The following references are of record in the file of this patent:

UNITED STATES PATENTS

| Number | Name | Date |
|---|---|---|
| 1,241,153 | Schule | Sept. 25, 1917 |
| 1,292,385 | Anderwert et al. | Jan. 21, 1919 |
| 1,972,988 | Giemsa et al. | Sept. 11, 1934 |
| 2,109,552 | Schindhelm et al. | Mar. 1, 1938 |
| 2,203,196 | Hanhart | June 4, 1940 |
| 2,270,451 | Keller | Jan. 20, 1942 |
| 2,282,323 | Dickey et al. | May 12, 1942 |
| 2,308,023 | Peterson | Jan. 12, 1943 |

FOREIGN PATENTS

| Number | Country | Date |
|---|---|---|
| 353,273 | France | June 24, 1905 |
| 181,783 | Germany | Mar. 1, 1907 |
| 458,843 | Great Britain | Dec. 28, 1936 |
| 491,551 | Great Britain | Sept. 5, 1938 |